United States Patent
Hashimoto (10) Patent No.: US 7,001,295 B2
(45) Date of Patent: Feb. 21, 2006

(54) HYDRAULIC TENSIONER

(75) Inventor: Hiroshi Hashimoto, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 101 days.

(21) Appl. No.: 10/359,399

(22) Filed: Feb. 5, 2003

(65) Prior Publication Data

US 2003/0162614 A1 Aug. 28, 2003

(30) Foreign Application Priority Data

Feb. 26, 2002 (JP) .............................. 2002-049790

(51) Int. Cl.
*F16H 7/08* (2006.01)
*F16H 7/22* (2006.01)

(52) U.S. Cl. ...................... 474/110; 474/109

(58) Field of Classification Search ........ 474/109–110, 474/111, 140, 133–138
See application file for complete search history.

(56) References Cited

U.S. PATENT DOCUMENTS

| 4,790,796 A | | 12/1988 | Okabe | |
| 4,881,927 A | * | 11/1989 | Suzuki | 474/110 |
| 4,940,447 A | | 7/1990 | Kawashima | |
| 4,963,121 A | * | 10/1990 | Himura et al. | 474/110 |
| 5,116,284 A | * | 5/1992 | Cho | 474/110 |
| 5,482,262 A | | 1/1996 | Hayakawa | |
| 5,569,105 A | | 10/1996 | Sakai | |
| 5,632,474 A | | 5/1997 | Hayakawa | |
| 5,658,212 A | * | 8/1997 | Meurer et al. | 474/110 |
| 5,700,213 A | * | 12/1997 | Simpson et al. | 474/110 |
| 5,707,309 A | * | 1/1998 | Simpson | 474/110 |
| 6,361,458 B1 | * | 3/2002 | Smith | 474/109 |

FOREIGN PATENT DOCUMENTS

| GB | 2262582 | | 6/1993 |
| GB | 2280240 | | 1/1995 |
| GB | 2356683 A | * | 5/2001 |
| JP | 62-172846 | | 11/1987 |
| JP | 07-42804 A | * | 2/1995 |
| JP | 11-336855 | | 12/1999 |
| JP | 2000-329204 | | 11/2000 |

* cited by examiner

*Primary Examiner*—Marcus Charles
(74) *Attorney, Agent, or Firm*—Dann, Dorfman, Herrell and Skillman, P.C.; Henry H. Skillman (57) ABSTRACT

To provide a hydraulic tensioner, which can prevent the bottoming out or over-stressing of a spring in an incorporated check valve, can reduce the contact surface pressure between a check ball and a retainer, and can reduce the production cost, a hydraulic tensioner comprises a check valve incorporated in the housing which causes oil to flow into a high pressure chamber to block the back flow of oil. The check valve comprises a ball seat, a check ball facing the ball seat, a spring, which biases the check ball against the ball seat and a retainer, which retains the spring and limits the movement of the check ball. The spring comprises a conical coil spring, and the surface of the retainer, which retains the conical coil spring and limits the movement of the check ball, is formed in a flat surface.

2 Claims, 7 Drawing Sheets

HYDRAULIC TENSIONER

RELATED APPLICATION

The present application claims priority from Japanese Patent Application No. 2002-049790 filed Feb. 26, 2002.

FIELD OF THE INVENTION

The present invention relates to a hydraulic tensioner having a check valve used for applying proper tension to a timing belt or a timing chain or the like in a vehicle engine or the like.

BACKGROUND OF THE INVENTION

A hydraulic tensioner has been widely used in a timing belt or a timing chain, which transmits rotation between a crankshaft and a camshaft of a vehicle engine, to suppress vibration generated during displacement of the timing belt or timing chain, and to maintain proper tension. A number of conventional hydraulic tensioners have been proposed which feature a check valve, as disclosed in Japanese Laid-Open Patent Publication No. Hei-11-336855.

Figure 8:
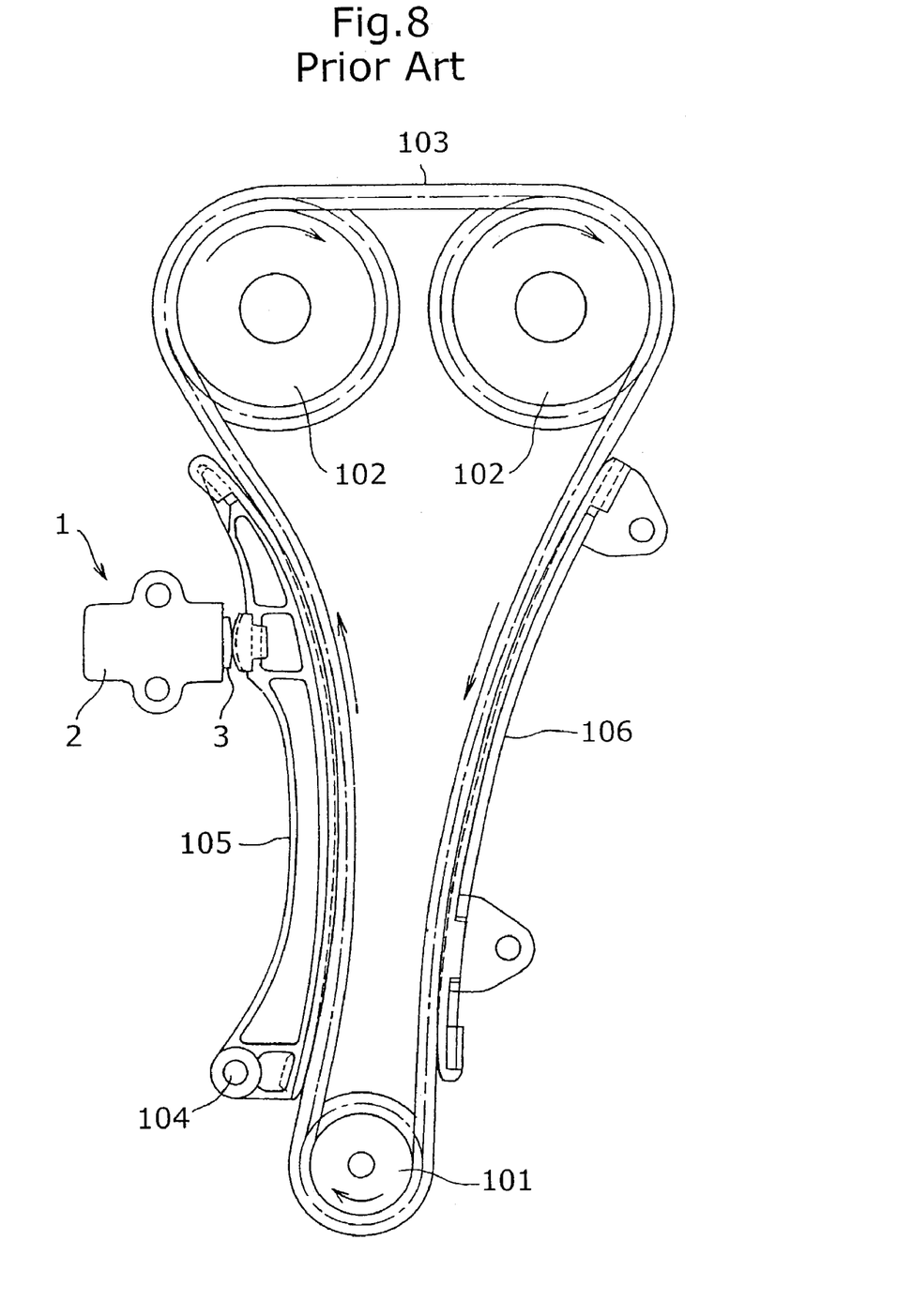
FIG. 8 is a schematic view showing an example of use of a conventional hydraulic tensioner.

FIG. 8 shows an example of such a conventional hydraulic tensioner 1 having a check valve. The hydraulic tensioner 1 is attached to an engine body on a slack side of a chain 3 trained over a drive sprocket 101, which is rotated by a crankshaft of the engine and driven side sprockets 102, each fixed to a camshaft.

In this hydraulic tensioner 1, a plunger is protruded and retracted from the front surface of the housing 2, and by pushing the back surface of a lever 105, which is near the pivoting end and pivotably supported on the engine body side, with the plunger 3, tension is imparted to the slack side of the chain 103 through the lever. Further, on the tension side of the chain 103, a guide 106, which guides the chain 103, is attached to the engine body. Further, when the drive sprocket 101 is rotated in a direction of the arrow, the chain 103 is displaced in the direction of the arrow. Consequently, the rotation of the drive sprocket 101 is transmitted to the driven sprockets 102.

Figure 9:
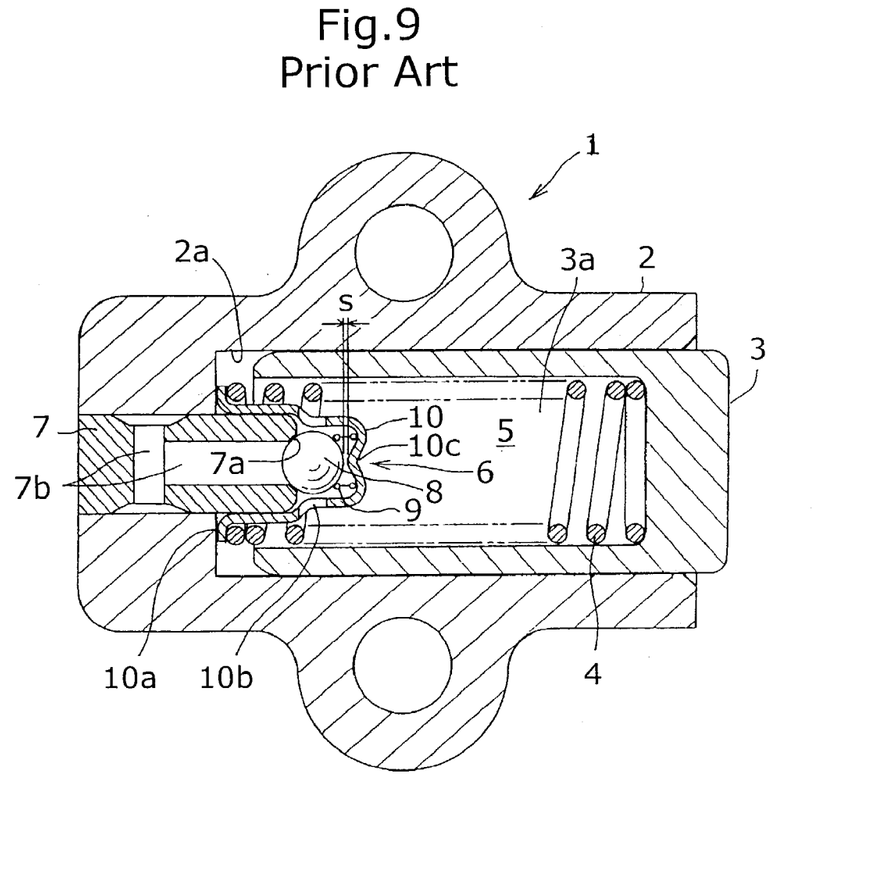
FIG. 9 is a cross-sectional view of a conventional hydraulic tensioner.

In a hydraulic tensioner 1 shown in FIG. 9, a plunger 3 is slidably received in a hole 2a formed in a housing 2. A hollow bore 3a having an open end is formed in the plunger 3. A plunger biasing spring 4 inside the bore 3a biases the plunger 3 toward the open end of the plunger receiving hole 2a. The plunger biasing spring 4 is always biased so that the front end of the plunger 3 is protruded outside the plunger receiving hole 2a. A high pressure chamber 5 comprises the plunger receiving hole 2a and the hollow portion 3a. The high pressure chamber 5 is filled with oil supplied by an oil supply source not shown. The oil is supplied through a check valve 6, which is described later.

The check valve 6, which faces the hollow bore 3a of the plunger 3, causes oil to flow into the high pressure chamber 5 and blocks the back flow of oil out of the chamber. The check valve 6 is incorporated into the plunger receiving hole 2a formed in the housing 2. The check valve 6 comprises a ball seat 7, a check ball 8 facing the ball seat 7, a cylindrical coil spring 9, which push-biases the check ball 8 against the ball seat 7, and a retainer 10, which retains the cylindrical coil spring 9 and limits movement of the check ball 8, as shown in FIG. 9.

Figure 10:
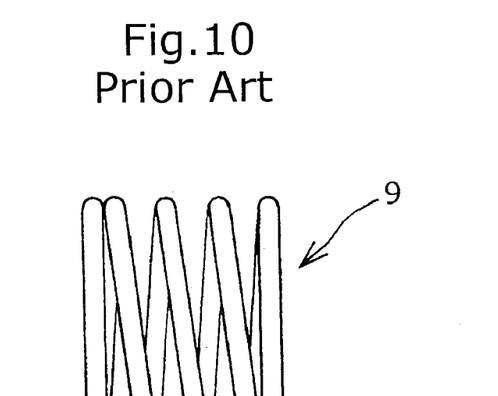
FIG. 10 is an enlarged view of a cylindrical coil spring forming a check valve of the hydraulic tensioner shown in FIG. 9.

The ball seat 7 forms a valve seat 7a at an end surface facing the check ball 8. Oil passages 7b, which communicate with an oil supply source not shown, are formed in the ball seat 7. The ball seat 7 is press-fitted into a bottom portion in the plunger receiving hole 2a of the housing 2. The cylindrical coil spring 9 is shown in FIG. 10 in an enlarged view. A brim 10a is formed on one end of the retainer 10 and a communicating hole 10b through which oil is passed is formed on a side of the retainer 10. Further, in the retainer, a protrusion 10c is formed which protrudes toward the check ball 8. The protrusion limits the distance "S" through which the check ball 8 is moved so that the coil spring 9 is not bottomed out and over-stressed, so as to exert pressure on the wall of the retainer. The brim 10a of the retainer 10 is retained against the bottom of the plunger receiving hole 2a by the plunger biasing spring 4, so that the check ball 8 is pushed against the valve seat 7a of the ball seat 7 by the cylindrical coil spring 9. The retainer 10 is produced by sheet-metal working using a mold.

In the hydraulic tensioner 1 formed as mentioned above, the lever 105 exerts an impact force F on the front end of the plunger 3 in response to a change of tension in the chain 103. When the plunger 3 is rapidly pushed back while resisting a biasing force of the plunger biasing spring 4, the pressure of oil in the high pressure chamber 5 is increased to push the check ball 8 onto the valve seat 7a of the ball seat 7 as shown in FIG. 9, whereby the back flow of oil from the high pressure chamber 5 into the oil passage 7b of the ball seat 7 is prevented.

As a result, the oil pressure in the high pressure chamber 5 is further increased, and oil leaks through a small gap formed between an outer circumferential surface of the plunger 3 and an inner circumferential surface of the hole 2a. The oil leaks through the gap and is discharged outside the housing 2. Accordingly, the impact force F acted on the plunger 3 by fluid resistance due to the viscosity of oil, which is generated at the time of the discharge of oil, is reduced and the vibration of the plunger 3 due to said impact force F is speedily diminished.

Figure 11:
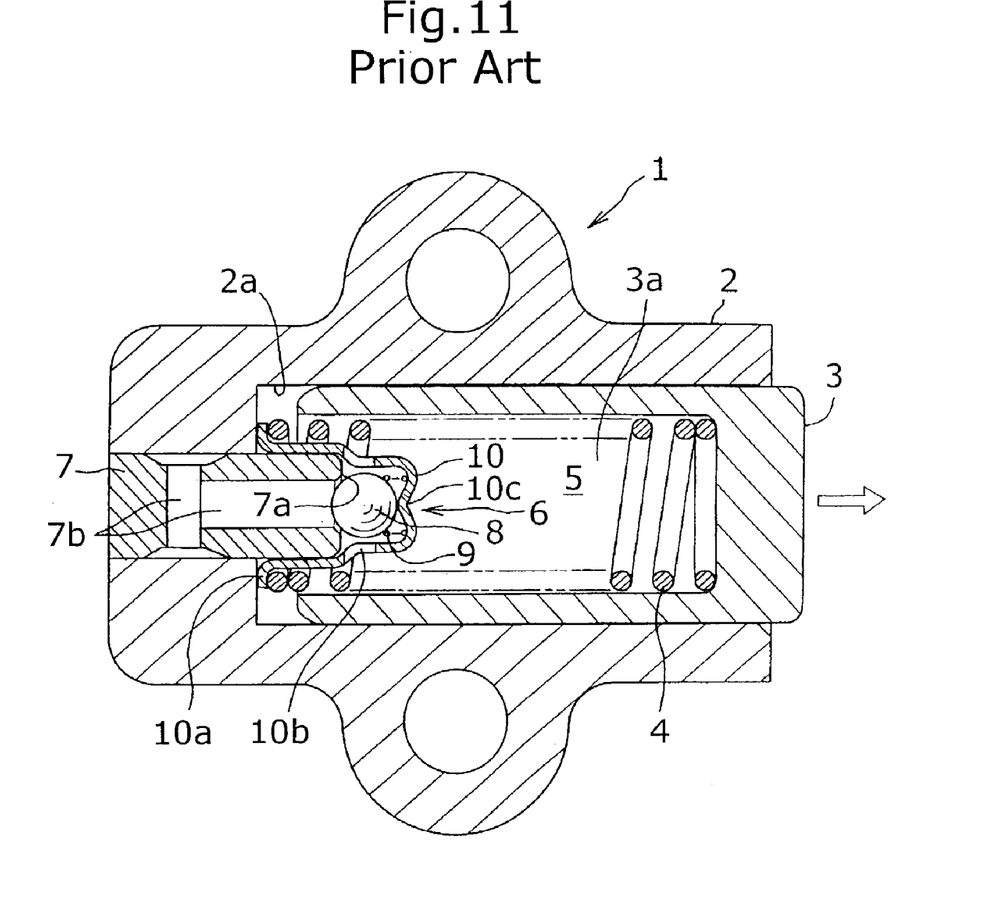
FIG. 11 is a cross-sectional view showing a state where the check valve of the hydraulic tensioner shown in FIG. 9 is opened.

On the other hand, when the engine is started, and the chain 103 is momentarily slackened on the hydraulic tensioner 1 side, the plunger 3 is momentarily protruded from the housing 2 in a direction of the arrow in FIG. 11 by the biasing force of the plunger biasing spring 4. This advances the lever 105 against the chain 103 to tension the chain and remove the slack.

In this case, since the oil pressure in the high pressure chamber 5 is decreased, the check ball 8 in the check valve 6 is separated from the valve seat 7a of the ball seat 7. The check valve 6 is thereby opened, and oil is supplied into the high pressure chamber 5 from the oil passage 7b in the ball seat 7. At this time, the check ball 8 moves while pressing the cylindrical coil spring 9. However, the distance "S" through which the check ball 8 moves is limited by a protrusion 10c provided in the retainer 10, so that the cylindrical coil spring does not bottom out or become over-stressed.

However, hydraulic tensioner 1 has the following problems. That is, since as mentioned above, the protrusion 10c provided in the retainer 10 limits the movement of the check ball 8, the molding of the protrusion 10c requires working accuracy. Further, when the protrusion 10c wears, close contact of the cylindrical coil spring 9 with the retainer 10 is encountered and the cylindrical coil spring 9 is broken. To improve the wear resistance of protrusion 10c, heat treatment is required for increasing the hardness of the surface of the protrusion 10c, which increases the production cost. Alternatively, if the height of the protrusion 10c is increased, a time margin can be provided for an amount of wear till the occurrence of close contact of the cylindrical coil spring 9 with the retainer 10. However, providing the amount of wear with a time margin was impossible for reasons of molding, strength and limitation of inner diameter of the cylindrical coil spring 9.

SUMMARY OF THE INVENTION

Accordingly, the objects of the present invention are to solve the above-mentioned problems and to provide a hydraulic tensioner, which can prevent the close contact of a spring in an incorporated check valve, can reduce the contact surface pressure between a check ball and a retainer, and can reduce the production cost.

To attain said objects, a hydraulic tensioner according to the invention includes a plunger slidably inserted into a plunger receiving hole provided in a housing in a condition where the plunger is spring-biased so that one end portion of the plunger protrudes from the house, a high pressure chamber defined by said plunger receiving hole and said plunger, and a check valve incorporated in said housing and which causes oil to flow into said high pressure chamber but blocks the back flow of oil out of the housing, said check valve comprising a ball seat, a check ball facing the ball seat, a spring, which biases the check ball onto said ball seat, and a retainer, which retains the spring and limits the movement of said check ball. The tensioner is wherein said spring comprises a conical coil spring, and the surface of said retainer, which retains the conical coil spring and limits the movement of said check ball, is formed in a flat surface or a concave surface.

Since the spring, which biases the check ball onto the ball seat, comprises a conical coil spring in the check valve, bottoming out and over-stressing of the spring can be prevented, reducing forces exerted on the retainer. Further, since the surface of said retainer, which retains the conical coil spring and limits the movement of said check ball is formed of a flat surface or a concave surface, contact pressure between the check ball and the retainer can be further reduced as compared with a conventional case where the movement of the check ball is limited by a protrusion formed in a retainer.

BRIEF DESCRIPTION OF THE DRAWINGS

FIG. 7 shows a retainer forming a check valve of the hydraulic tensioner shown in FIG. 6, particularly (A) is a side view viewed from the side opposite the high pressure chamber, and (B) is a side view viewed from the high pressure chamber side.

DETAILED DESCRIPTION OF THE INVENTION

A first embodiment of a hydraulic tensioner according to the present invention will be described with reference to FIGS. 1 to 5.

Figure 1:
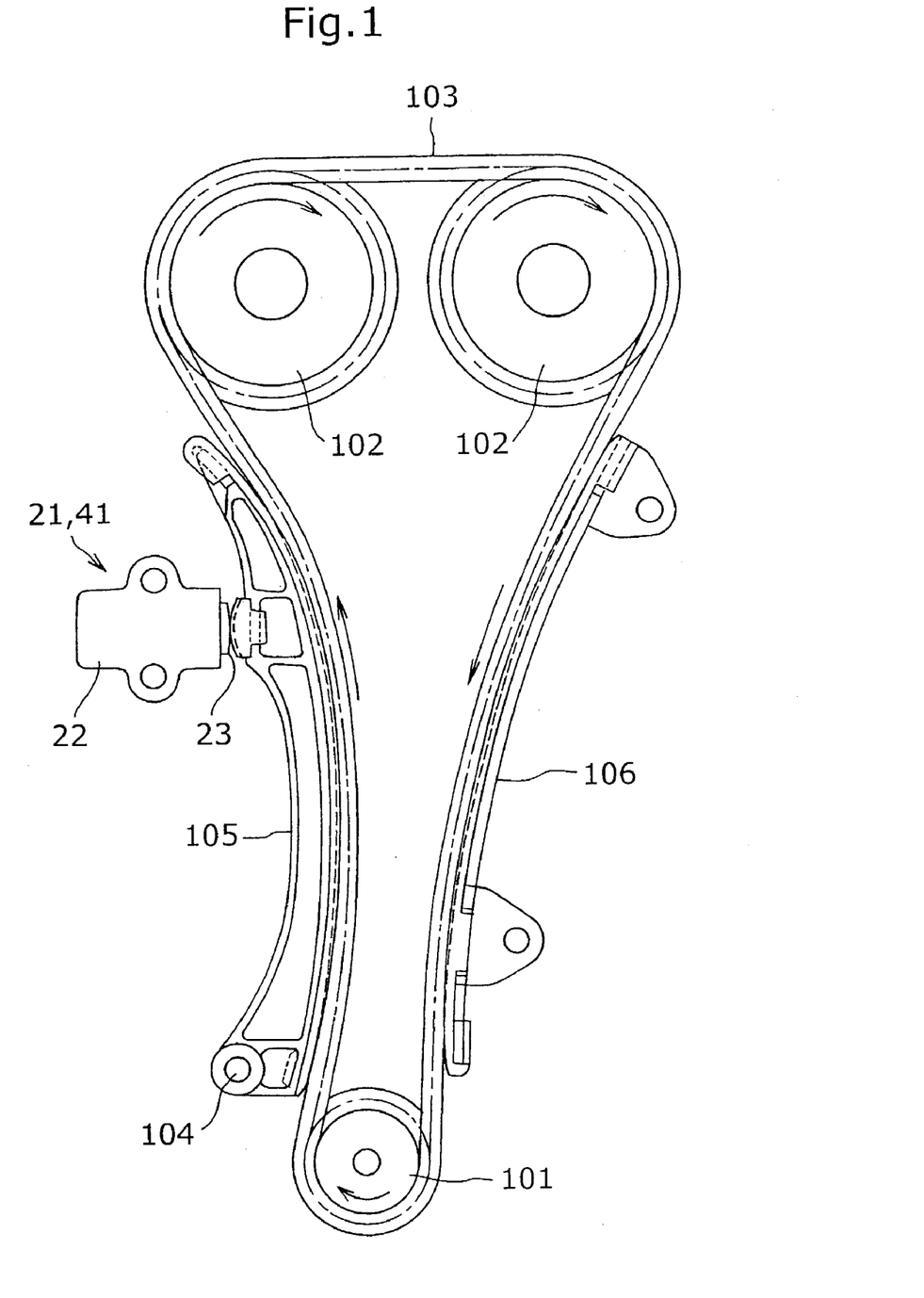
FIG. 1 shows a schematic view showing an example of use of hydraulic tensioners according to first and second embodiments of the present invention.

FIG. 1 is a schematic view showing an example of use of hydraulic tensioners according to first and second embodiments of the present invention.

Figure 2:
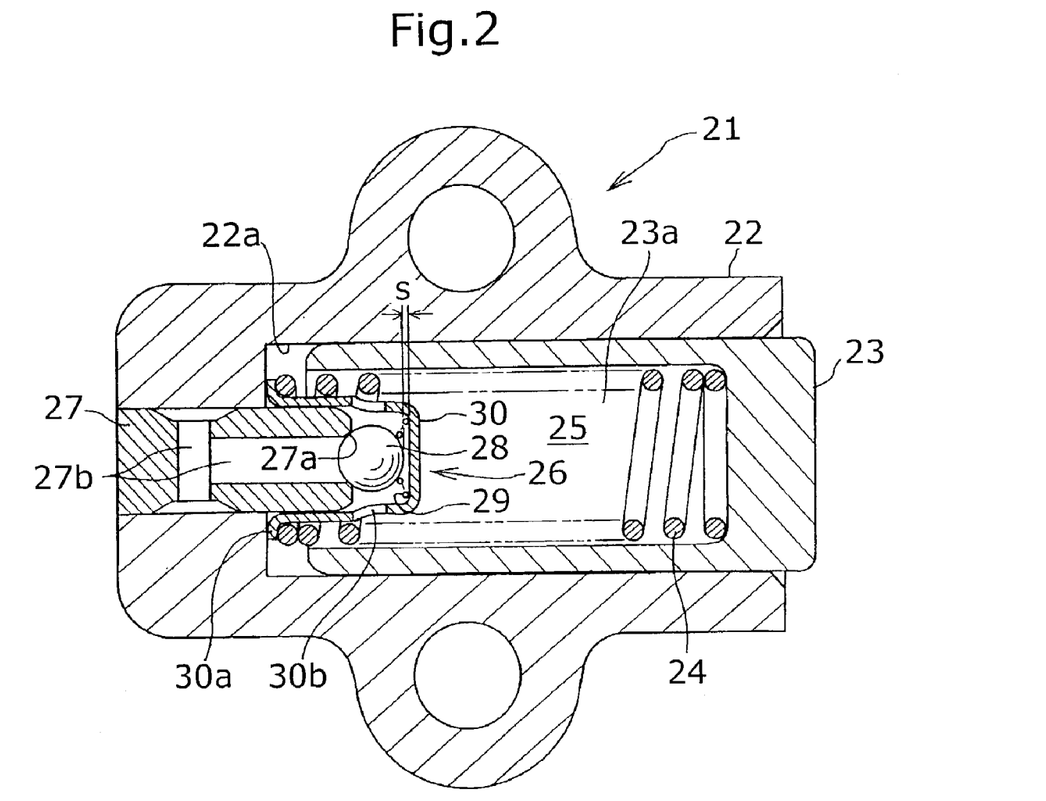
FIG. 2 is a cross-sectional view of the hydraulic tensioner according to the first embodiment of the present invention.

FIG. 2 is a cross-sectional view of the hydraulic tensioner according to the first embodiment of the present invention.

Figure 3:
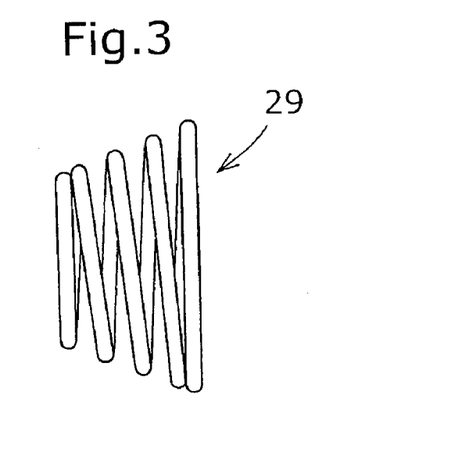
FIG. 3 is an enlarged view of a conical coil spring forming a check valve of the hydraulic tensioner shown in FIG. 2.

FIG. 3 is an enlarged view of a conical coil spring forming the check valve in the hydraulic tensioner shown in FIG. 2.

Figure 4:
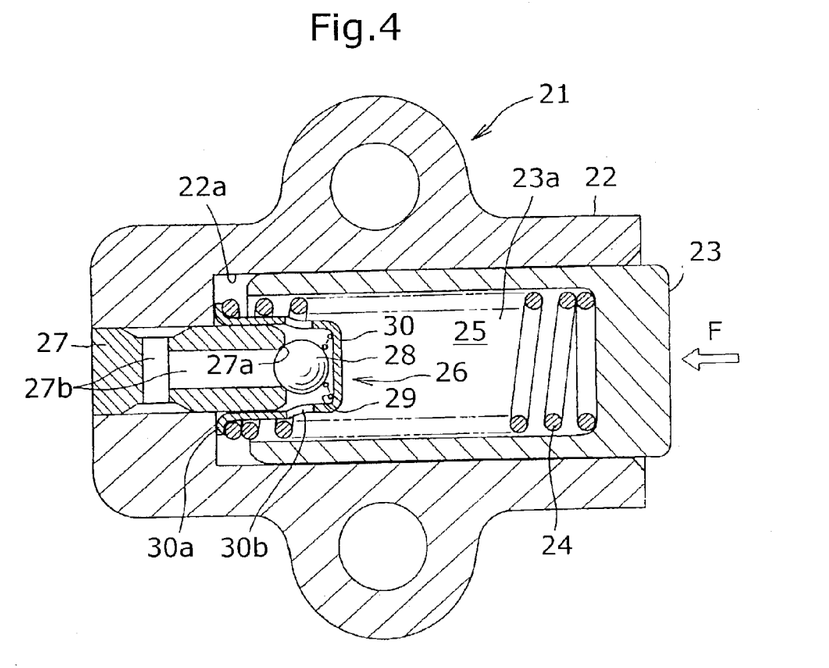
FIG. 4 is a cross-sectional view showing a state where the check valve of the hydraulic tensioner shown in FIG. 2 is closed.
Figure 5:
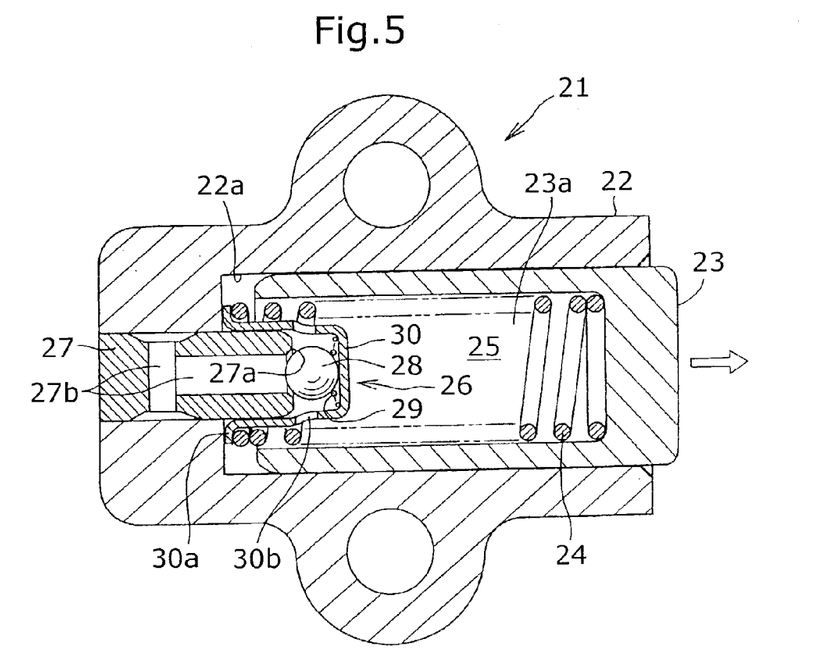
FIG. 5 is a cross-sectional view showing a state where the check valve of the hydraulic tensioner shown in FIG. 2 is opened.

FIG. 4 is a cross-sectional view showing a state where the check valve of the hydraulic tensioner shown in FIG. 2 is closed. FIG. 5 is a cross-sectional view showing a state where the check valve of the hydraulic tensioner shown in FIG. 2 is opened.

As shown in FIG. 1, a hydraulic tensioner 21 according to a first embodiment of the present invention is attached to an engine body on a slack side of a chain wrapped between a drive sprocket 101 rotated by a crankshaft of the engine and a pair of driven sprockets 102 each fixed to a camshaft. In this hydraulic tensioner 21, a plunger 23 is slidably disposed through a front surface of the housing 22. The plunger 23 imparts tension to the slack side of the chain 103 through a lever 105 by pushing the back of the lever 105. The lever 105 is pivotably supported on the engine body side with a pivot shaft 104, the back of the lever 105 being near a pivot support. Further, a guide 106, which guides the chain 103 is attached to the engine body on a tension side of the chain 103. When, when the drive sprocket 101 is rotated in a direction of the arrow, the chain 103 is displaced in a direction of the arrow and the driven sprockets 102 are rotated in a direction of the arrow by the displacement of the chain 103. Accordingly, the rotation of the drive sprocket 101 is transmitted to the driven sprockets 102.

In a hydraulic tensioner 21 shown in FIG. 2, a plunger 23 is slidably disposed in a plunger receiving hole 22a formed in the housing 22. A hollow portion 23a is formed in the plunger 23, with one end of the plunger 23 opened. Further, in the plunger 23 is received a plunger biasing spring 24, which biases the plunger in a protruding direction across the plunger receiving hole 22a and hollow portion 23a. The plunger biasing spring 24 is always biased so that the front end of the plunger 23 protrudes outside the plunger receiving hole 22a. Further, a high pressure chamber 25 comprises the plunger receiving hole 22a and the hollow portion 23a. The high pressure chamber 25 is filled with oil supplied by an oil supply source not shown. The oil is supplied through a check valve 26, which is described later.

The check valve 26, which faces the hollow portion 23a of the plunger 23, causes oil to flow into the high pressure chamber 25 thereby to block the back flow of oil. The check valve 26 is incorporated into a bottom of a plunger receiving hole 22a formed in the housing 22. The check valve 26 comprises a ball seat 27, a check ball 28 facing the ball seat 27, a conical coil spring 29, which biases the check ball 28 toward the ball seat 27, and a retainer 30, which retains the conical coil spring 29 and limits movement of the check ball 28, as shown in FIG. 2.

The ball seat 27 forms a valve seat 27a at an end surface facing the check ball 28. Oil passages 27b, which communicate with an oil supply source not shown, are formed in the ball seat 27. The ball seat 27 is press-fitted into a bottom portion in the plunger receiving hole 22a of the housing 22. The conical coil spring 29 is shown in FIG. 3 in an enlarged view. A brim 30a is formed on one end of the retainer 30 and a communicating hole 30b through which oil is passed is formed on a side of the retainer 30. Further, a surface of the retainer 30 facing the check ball 28 is formed of a flat surface. This flat surface supports one end of the conical coil spring 29 and limits the distance "S" through which the check ball 28 moves. Further, in the retainer 30, the brim 30a is pushed onto the bottom of the plunger receiving hole 22a by the plunger biasing spring 24 so that the check ball 28 is pushed on the valve seat 27a of the ball seat 27 through the conical coil spring 29. The retainer 30 is produced by sheet-metal working using a mold.

In the hydraulic tensioner 21 having the above-mentioned configuration, impact force F acts upon the front end of the plunger 23 through the lever 105 in response to a change of tension in chain 103. When the plunger 23 is rapidly pushed back while resisting a biasing force of the plunger biasing spring 24, the pressure of oil in the high pressure chamber 25 is increased to push the check ball 28 in the check valve 26 onto the valve seat 27a of the ball seat 27, as shown in FIG. 4. In this position, the check ball 28 prevents back flow of oil from the high pressure chamber 25 into the oil passage 27b of the ball seat 27.

As a result, the oil pressure in the high pressure chamber 25 is further increased, and oil leaks from a small gap between an outer circumferential surface of the plunger 23 and an inner circumferential surface of the plunger receiving hole 22a, so that the oil is discharged outside the housing 22. Accordingly, the impact force F acts on the plunger 23 by fluid resistance due to the viscosity of oil, which is generated at the time of the discharge of oil, is reduced, and the vibration of the plunger 23 due to said impact force F is speedily diminished.

When the engine is started, and the chain 103 is momentarily slackened on the hydraulic tensioner 21 side, the plunger 23 momentarily protrudes from the housing 22 in a direction of the arrow in FIG. 5 by the biasing force of the plunger biasing spring 24. This advances the lever 105 against the chain 103 to add tension to the chain and remove the slack.

In this case, since the oil pressure in the high pressure chamber 25 is decreased, the check ball 28 in the check valve 26 is separated from the valve seat 27a of the ball seat 27. The check valve 26 is thereby opened, as shown in FIG. 5, and oil is supplied into the high pressure chamber 25 from the oil passage 27b in the ball seat 27. At this time, the check ball 28 moves while pressing the conical coil spring 29. However, the distance "S" through which the check ball 28 moves is limited by a flat surface facing the check ball in the retainer 30. Further, since the check ball 28 is brought into contact with the flat surface of the retainer 30, contact pressure between the check ball 28 and the retainer 30 can be further decreased as compared with a case when a check ball contacts the protrusion in conventional retainers. Further, since the check valve 26 in the present embodiment uses a conical coil spring 29 to bias the check ball 28, the conical coil spring can not be compressed tightly into contact with the retainer 30, even if the retainer has a protrusion like the conventional case.

According to the hydraulic tensioner 21 the following effects are produced.

(1) Since the spring, which biases the check ball 28 onto the ball seat 27, comprises a conical coil spring 29 in the check valve 26, bottoming out of the spring can be prevented.

(2) Further, since the surface of said retainer 30, which retains the conical coil spring 29 and limits the movement of said check ball 28, is formed in a flat surface, a contact surface pressure between the check ball 28 and the retainer 30 can be further reduced as compared with a conventional case where the movement of the check ball is limited by a protrusion formed in the retainer.

(3) Since the contact surface pressure between the check ball 28 and the retainer 30 can be reduced, surface treatment for increasing the hardness of the surface of the retainer 30 is not required, and the production cost can be reduced.

(4) The retainer 30 is produced by metal-working, but the protrusion for limiting the movement of the check ball 28 is not required. Thus, the mold used for producing the retainer 30 can be simplified, the life of the mold can be extended, and the production cost can be reduced.

Figure 6:
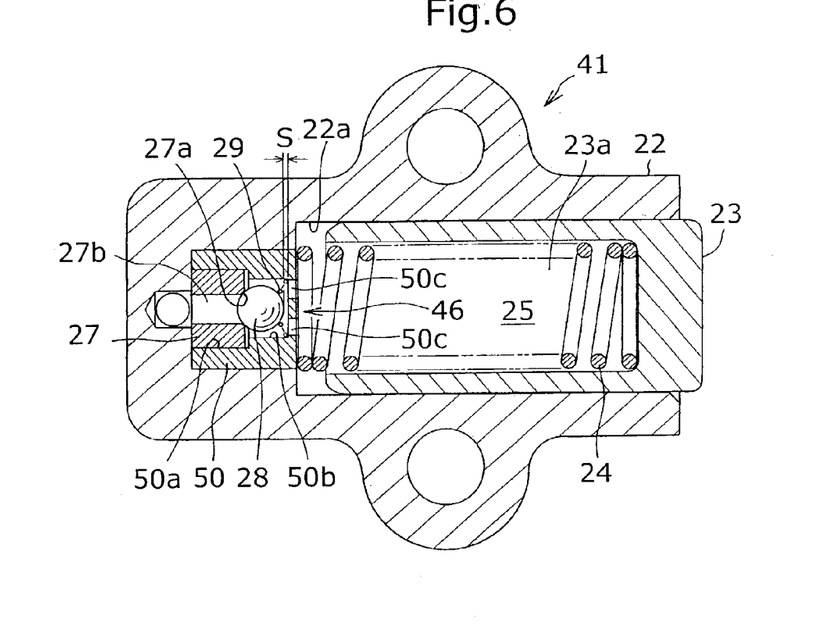
FIG. 6 is a cross-sectional view of the hydraulic tensioner according to the second embodiment of the present invention.
Figure 7A:
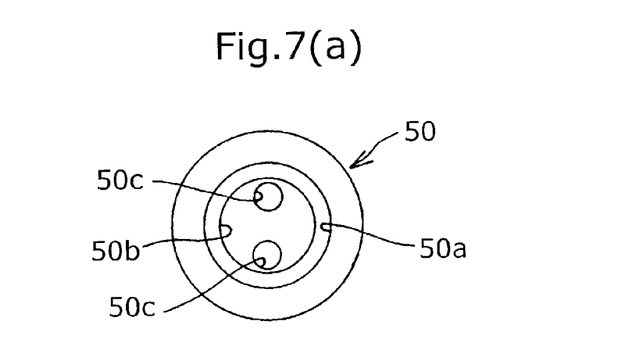
Figure 7B:
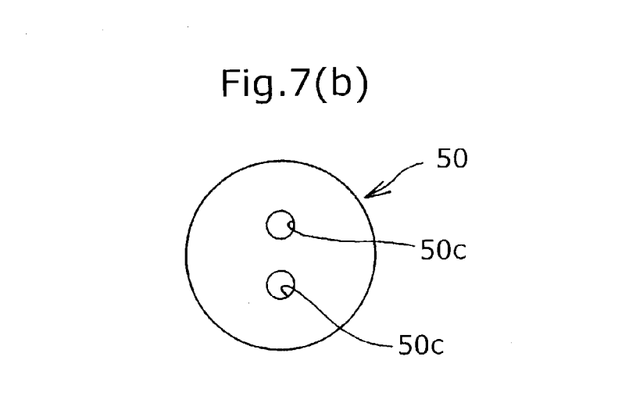

Next, a hydraulic tensioner according to a second embodiment of the present invention will be described with reference to FIGS. 6 and 7. FIG. 6 is a cross-sectional view of the hydraulic tensioner according to the second embodiment of the present invention. FIG. 7 shows a retainer, which defines a check valve in the hydraulic tensioner shown in FIG. 6, particularly, (A) is a side view viewed from the opposite side of to the high pressure chamber side and (B) is a side view viewed from the high pressure chamber side.

The hydraulic tensioner 41 according to embodiment 2 of the present invention shown in FIG. 6 is also used by being attached to the engine body as shown in FIG. 1 as in the hydraulic tensioner 21 according to embodiment 1 of the above-mentioned present invention.

In a comparison between the hydraulic tensioner 41 according to the second embodiment of the present invention and the above-mentioned hydraulic tensioner according to the first embodiment of the present invention, the structure of the retainer 50 in the second embodiment is different from the retainer in the first embodiment. All other features of the second embodiment are the same as those in the first embodiment of the present invention. Therefore, the same members are denoted as the same reference numerals. Overlapping explanations are omitted and the distinctions are mainly described.

In the hydraulic tensioner 41 according to the second embodiment of the invention shown in FIG. 6, the check valve 46 is incorporated at the bottom portion of a plunger receiving hole 22a formed in the housing 22. The check valve 46 faces a hollow portion 23a and causes oil to flow into high pressure chamber 25 thereby to block the back flow of oil. The check valve 46 comprises a ball seat 27, a check ball 28 facing the ball seat 27, a conical coil spring 29, which biases the check ball 28 against the ball seat 27, and a retainer 50, which retains the conical coil spring 29 and limits movement of the check ball 28, as shown in FIG. 6.

The retainer 50 is produced by mechanical working. Further, the retainer 50 is of a cylindrical shape as shown in FIGS. 6 and 7, and has a large diameter bore 50a and a small diameter bore 50b coaxially aligned with the large diameter bore. Further, two communicating holes 50b are opened in the bottom. The conical coil spring 29 is inserted in the small diameter bore 50b, followed by the check ball 28. The ball seat 27 is disposed in the lame diameter bore 50a. The check ball 28 is brought into contact with a valve seat 27a of the ball seat 27, and one end of the conical coil spring 29 is supported on the bottom portion of the small diameter bore 50b. Further, the ball seat 27/check ball 28/conical coil spring 29-incorporated retainer 50 is press-fitted into a hole formed in the bottom of the plunger receiving hole 22a of the housing 22. Further, the bottom portion of the retainer 50 has two holes, and forms a flat surface facing the check ball 28. This flat surface supports one end of the conical coil spring 29 and limits the movement of the check ball 28.

In the hydraulic tensioner 41 having the above-described configuration, impact force F is acts on the front end of the plunger 23 through the lever 105 in response to a change of tension in chain 103. When the plunger 23 is rapidly pushed back while resisting a biasing force of the plunger biasing spring 24, the pressure of oil in the high pressure chamber 25 is increased to push the check ball 28 in the check valve 46 onto the valve seat 27a of the ball seat 27. In this position, the check ball 28 prevents back flow of oil from the high pressure chamber 25 into the oil passage 27b of the ball seat 27.

As a result, the oil pressure in the high pressure chamber 25 is further increased, and oil leaks from a small gap between an outer circumferential surface of the plunger 23 an inner circumferential surface of the plunger receiving hole 22a, said oil being discharged outside the housing 22. Accordingly, the impact force F acting as the plunger 23 by fluid resistance due to the viscosity of oil, which is generated at the time of the discharge of oil, is reduced, and the vibration of the plunger 23 due to said impact force F is speedily diminished.

On the other hand, when the engine is started and slack in the chain 103 is momentarily generated on the hydraulic tensioner 21 side, the plunger 23 momentarily protrudes from the housing 22 by the biasing force of the spring 24. This advances the lever 105 against the chain 103 to tension the chain and remove the slack. In this case, since the oil pressure in the high pressure chamber 25 is decreased, the check ball 28 in the check valve 46 is separated from the valve seat 27a of the ball seat 27 and the check valve 46 is opened, allowing oil to enter into the high pressure chamber 25 from the oil passage 27b in the ball seat 27. At this time, the check ball 28 moves while pressing the conical coil spring 29. However, the movement of the check ball 28 is limited by the flat surface facing the check ball 28 in the retainer 50. Further, since the check ball 28 is brought into contact with the flat surface of the retainer 50, contact pressure between the check ball 28 and the retainer 50 can be further decreased as compared with a case where the check ball 28 contacts a protrusion in a conventional retainer. Further, since the check valve 46 in the present embodiment uses a conical coil spring 29, which biases the check ball 28, the compressed conical coil spring 29 does not bear tightly against the retainer 50.

According to the hydraulic tensioner 41, the following effects are exhibited.

(1) Since the spring, which biases the check ball 28 onto the ball seat 27, comprises a conical coil spring 29 in the check valve 46, bottoming out of the spring can be prevented.

(2) Further, since the surface of said retainer 50, which retains the conical coil spring 29 and limits the movement of said check ball 28, is formed of a flat surface, a contact surface pressure between the check ball 28 and the retainer 50 can be further reduced as compared with a conventional case where the movement of the check ball is limited by a protrusion formed in the retainer.

(3) Since the contact surface pressure between the check ball 28 and the retainer 50 can be reduced, surface treatment for increasing the hardness of the surface of the retainer 50 is not required, and the production cost can be reduced.

(4) The retainer 30 is produced by metal-working, but the protrusion for limiting the movement of the check ball 28 is not required. Thus, the metal working can be simplified, working time is reduced, and the production cost is reduced. The mold for producing the retainer 30 can be simplified and the production time can be reduced to reduce reduction costs.

It is noted that in the above-described hydraulic tensioners according to both embodiments of the present invention, the surface of the retainer that supports the spring and limits the movement of the check ball has been described with a flat configuration. However, the surface need not have a flat configuration, but it may have a concave surface which supports a conical coil spring and limits the movement of the check ball. When the surface of the retainer, which supports a conical coil spring and limits the movement of the check ball, is formed with a concave surface, the contact surface pressure between the check ball and the retainer can be further reduced as compared with a case where the surface of said retainer is formed in a flat surface.

The hydraulic tensioners according to both embodiments of the present invention do not include a conventionally well known no-backing system in which the retraction of the plunger is blocked by meshing a rack formed in the plunger with a pawl of a check pawl body pivoted to the housing. However, the present invention can be applied to a hydraulic tensioner including such a no-backing system.

The hydraulic tensioner according to the present invention includes the above-described configuration and exhibits the following effects.

(1) Since the spring, which biases the check ball against the ball seat, comprises a conical coil spring in the check valve, bottoming out of the spring can be prevented.

(2) Further, since the surface of said retainer, which retains the conical coil spring and limits the movement of said check ball, is formed in a flat or concave surface, a contact surface pressure between the check ball and the retainer can be further reduced as compared with a conventional case where the movement of the check ball is limited by a protrusion formed in the retainer.

(3) Since the contact surface pressure between the check ball and the retainer can be reduced, surface treatment for increasing the hardness of the surface of the retainer is not required, and the production cost can be reduced.

(4) The retainer is produced by metal-working, but the protrusion for limiting the movement of the check ball is not required for the retainer unlike a conventional case. Thus, the mold for producing the retainer can be simplified, the life of the mold can be extended, and the production cost can be reduced.

(5) The retainer is produced by mechanical-working, but the protrusion for limiting the movement of the check ball 28 is not required for the retainer unlike a conventional case. Thus, the mechanical working can be simplified, working time is reduced, and the production cost is reduced. The mold for producing the retainer can be simplified, and the production time can be reduced to reduce production cost

What is claimed is:

1. A hydraulic tensioner for a timing chain for an engine including a housing having a plunger-receiving hole, and a bore at the inner end of said hole having a connection to a pressurized oil source in the engine, a plunger slidably protruding from the outer end of said plunger-receiving hole, a first spring biasing the plunger so that the outer end portion of the plunger is protruded toward the timing chain, a high pressure chamber being defined by said plunger-receiving hole and said plunger, and a check valve subassembly fitted into said bore which causes oil to flow into said high pressure chamber and to block the back flow of oil, wherein said check valve subassembly comprises a ball seat communicating with said oil connection and having an expose flat end surface flush with the inner end of said hole, a check ball facing the end surface of said ball seat, a conical coil spring having a central axis, which biases the check ball onto said ball seat, and a retainer, said retainer comprising a hollow cylindrical structure coaxial with said conical coil spring, said hollow cylindrical structure forming said exposed flat end surface, a large cylindrical interior bore remote from said flat end surface and surrounding said ball seat, and a smaller cylindrical bore between said large cylindrical bore and said flat end surface and surrounding said conical coil spring, said flat surface having at least one communicating hole communicating with said high pressure chamber, said communicating hole being offset from the central axis of said conical coil spring to provide a central abutment surface area for limiting the movement of said check ball without impeding the flow of oil from said check valve into said high pressure chamber.

2. A hydraulic tensioner according to claim 1 wherein said subassembly is slidably fitted into said bore, and is retained therein by the inner end of said first spring bearing against said exposed flat end surface.

* * * * *

UNITED STATES PATENT AND TRADEMARK OFFICE
CERTIFICATE OF CORRECTION

PATENT NO. : 7,001,295 B2
DATED : February 22, 2006
INVENTOR(S) : Hiroshi Hashimoto It is certified that error appears in the above-identified patent and that said Letters Patent is hereby corrected as shown below:

Column 6,
Line 65, "50b" should read -- 50c --.

Signed and Sealed this

Ninth Day of May, 2006

JON W. DUDAS
*Director of the United States Patent and Trademark Office*

UNITED STATES PATENT AND TRADEMARK OFFICE
CERTIFICATE OF CORRECTION

PATENT NO.    : 7,001,295 B2
DATED         : February 21, 2006
INVENTOR(S)   : Hiroshi Hashimoto

It is certified that error appears in the above-identified patent and that said Letters Patent is hereby corrected as shown below:

Column 6,
Line 65, "50b" should read -- 50c --.

This certificate supersedes Certificate of Correction issued May 9, 2006.

Signed and Sealed this

Twenty-third Day of May, 2006

JON W. DUDAS
*Director of the United States Patent and Trademark Office*